United States Patent [19]

Paudice et al.

[11] 4,283,440
[45] Aug. 11, 1981

[54] THERMAL SHEET PRODUCTION PROCESS

[75] Inventors: Ciro Paudice, Vasto; Oscar De Lena, Termoli, both of Italy

[73] Assignee: Societa' Italiana Vetro-SIV-S.p.A., Italy

[21] Appl. No.: 113,746

[22] Filed: Jan. 21, 1980

[30] Foreign Application Priority Data

Feb. 6, 1979 [IT] Italy ............................. 19925 A/79

[51] Int. Cl.³ ..................... B05D 5/12; B05D 1/36; C03C 17/40
[52] U.S. Cl. .................................. 427/108; 427/163
[58] Field of Search ............... 427/108, 163; 428/209, 428/210; 219/203

[56] References Cited

U.S. PATENT DOCUMENTS 3,772,075  11/1973  Tarnopol et al. ............... 427/108 X
3,852,564  12/1974  Baum et al. ..................... 428/209 X
3,900,634  8/1975   Plumat et al. .................. 427/108 X

FOREIGN PATENT DOCUMENTS 703778   2/1954  United Kingdom .
1290867  9/1972  United Kingdom .

Primary Examiner—James R. Hoffman
Attorney, Agent, or Firm—McGlew and Tuttle

[57] ABSTRACT

In a process for the production of thermal pane of the type having an electrically conductive circuit on a glass pane, a plurality of electrically conductive inks are produced, each of which has different resistivity. On at least one side of the glass pane a continuous circuit having a constant section along its length is formed by layering each of the inks along the length of the circuit at predetermined locations so that the resistivity of the circuit changes along the length thereof.

9 Claims, 4 Drawing Figures

THERMAL SHEET PRODUCTION PROCESS

BACKGROUND OF THE INVENTION

The invention relates to a process for the production of thermal sheets and thermal sheets produced thereby. By "thermal sheets" we mean heated rear window panes for motor cars, as well as ship porthole panes, train and aircraft window panes, windshields for any kind of vehicle, and furthermore glass sheets or panes which can be used for factories, shops and houses.

As it is known, thermal sheets are made of a sheet of safety glass fitted at least on one side with electrically conductive stripes, the purpose of which is to heat the sheet itself so that demisting and/or defrosting thereof is obtained.

It is known that the aforesaid electrically conductive strips are generally produced by screen-printing of suitable paints and inks made of a frit—that is to say, a binder—and of a conductive metal, suitably mixed together so as to obtain desired electrical resistance values, and the desired power dissipation values deriving therefrom.

To vary the amount of heat in certain portions of the glass sheet, the two following processes are generally employed:

(a) Carrying-out of galvanic reinforcing—e.g. with copper—on the strips themselves, graduating the abovesaid reinforcings for thickness and location on the strips; or (b) Direct alteration of thickness or width of the strips.

In all these cases, several problems and inconveniences have to be dealt with.

Thus, the transfer of the electric circuit on the screen-printing frame is troublesome, as it is necessary to vary, as continuously and as precisely as possible, the cross-section of necessarily small lines (0.4 to 0.8 mm) on the negative slide from which (by means of a direct photographic system) the impression of the desired electrical circuit on a photosensitive jelly is obtained.

During print and subsequent stoving, at the thinnest sections or where passages from one section to another take place, circuit breakage may easily occur, due, for example, to the solvent evaporating, which leave a portion without conductive metal, thus causing rejects.

Cross-section reductions or single points may cause dissipated power peaks and, therefore, overheat and consequently cause circuit breakage during operation thereof When, due to special aesthetical functional requirements, a concentration of filaments is necessary, this causes overheating of the portion over which this concentration occurs, unless thicker wires are used. This is aesthetically displeasing, and also dangerously reduces the pane's transparency An imprecise graduation of the width change also causes steps that may appear displeasing to the eye In places where resistance must reach low values, vast width increases are necessary, creating thus more unsightly areas.

SUMMARY OF THE INVENTION

To avoid these inconveniences, the technique of the present invention acts on the resistivity of the filament along its length. Bearing in mind formula $R = \rho(l/S)$, in which R is the resistance of the conductive strip, it is clearly understood that the above will increase as these sections decreases and as resistivity $\rho$ becomes greater, while length l remains constant.

It is known, according to the formula $P = RI^2$, that when electrical current intensity I is steady and section S becomes smaller, the same dissipated power P increases locally with resistance R.

It is an object of the invention to obtain a change of dissipated power, maintaining nevertheless the section of each filament along its entire length, by increasing resistivity values in the preferential areas.

The thermal pane production process, according to the invention, includes the steps of overlaying at least one side of the safety glass panes with electrically conductive strips which display, all or part thereof, portions which are suited for dissipating different potentials, due to the fact that they are made of inks which vary their compositions and resistivities along the length of the shape.

This overlaying is preferably, but not exclusively done by means of screen-printing, by using a frame with bare or metal-coated polyester-threads and produced according to known processes. Predetermined quantities of two or more screen-printing inks having different resistivities are placed by means of suitable dosimeters onto a section parallel to the frame wires and located outside the areas to be screen-printed.

Subsequently, screen-printing of the circuit is accomplished through the use of a spatula or squeegee which is moved across the frame threads. Because of this operation, the circuit will be made of filaments having different resistivity in the areas where different-characteristics inks have been layed on the frame. The phase during which the dosimeters lay the inks on the frame is easily controlled. Therefore, areas where different inks are layed over each other can occur and their length can be increasingly varied from values close to zero. In such areas, two of differing resistivity may be inks mix with each other and generate resistance values intermediate the neighboring values of the two. This permits gradual adjustment of the thermal gradient along the filament during the heating phase, thus avoiding sudden power peaks.

The thermal pane production process according to the invention herein described provides several advantages. These are:

If screen-printing is used, a simpler print frame preparation is required, thus advantageously cutting down expenses.

Strip width may be optimized, so that the printing process becomes quite reliable, avoiding the interruptions typical of traditional methods, therby achieving a remarkable reduction in the number of rejects;

A circuit having an aesthetically superior appearance may be formed.

The inventive process allows greater reliability of the product in the long run against saline fog corrosion, accidental abrasions, and so on The inventive process does not require—where low-potential filament sections must be made—recourse to wider filaments, which would impair view and therefore safety when related to required potential reduction and to rear windshield inclination.

Moreover, in accordance with the inventive process, an infinite number of electrically conductive ink combinations becomes possible, which can be obtained by mixing the inks in different percentages by means of any number of suitably located dosimeters. It is therefore possible to make any thermal profile required, without impairing aesthetics or worse still reliability and functionality of the circuit.

By means of resistivity $\rho$ control, the inventive arrangement allows much greater dissipation of potential values to be reached compared to those which could be obtained with usual methods.

It is a further object of the invention to provide in a process for the production of thermal pane of the type having an electrically conductive circuit on a glass pane, the improvement comprising the steps of producing a plurality of electrically conductive inks, each of the inks having a different resistivity, forming on at least one side of the glass pane a continuous circuit having a constant section along its length by layering each of the inks along the length of the circuit at predetermined locations so that the resistivity of the circuit changes along the length thereof. In a preferred embodiment of the invention the forming step includes screen printing.

It is a further object of the invention to produce a thermal pane in accordance with the inventive process. It is still a further object of the invention to provide a process for the production of thermal pane which is simple and economical.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION

Figure 1:
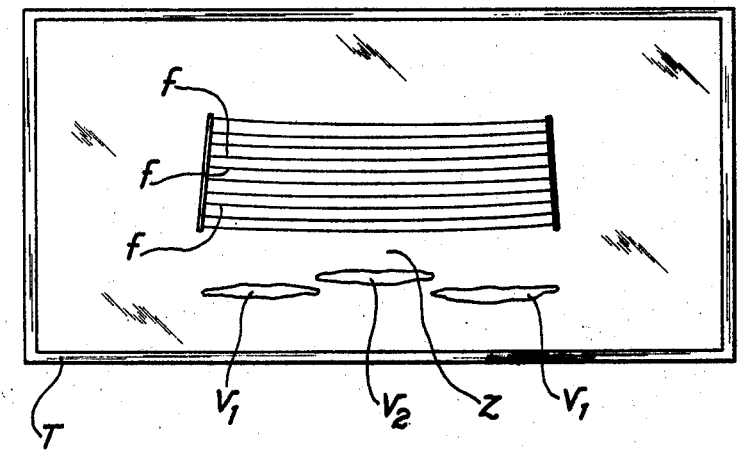
FIG. 1 is a schematic representation of a known screen printing frame.
Figure 2:
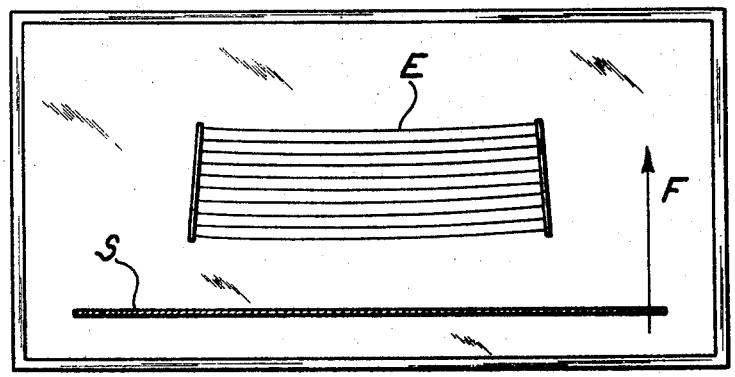
FIG. 2 is a schematic representation of a screen pringing frame including a spatula or squeegee designed to move across the frame.
Figure 3:
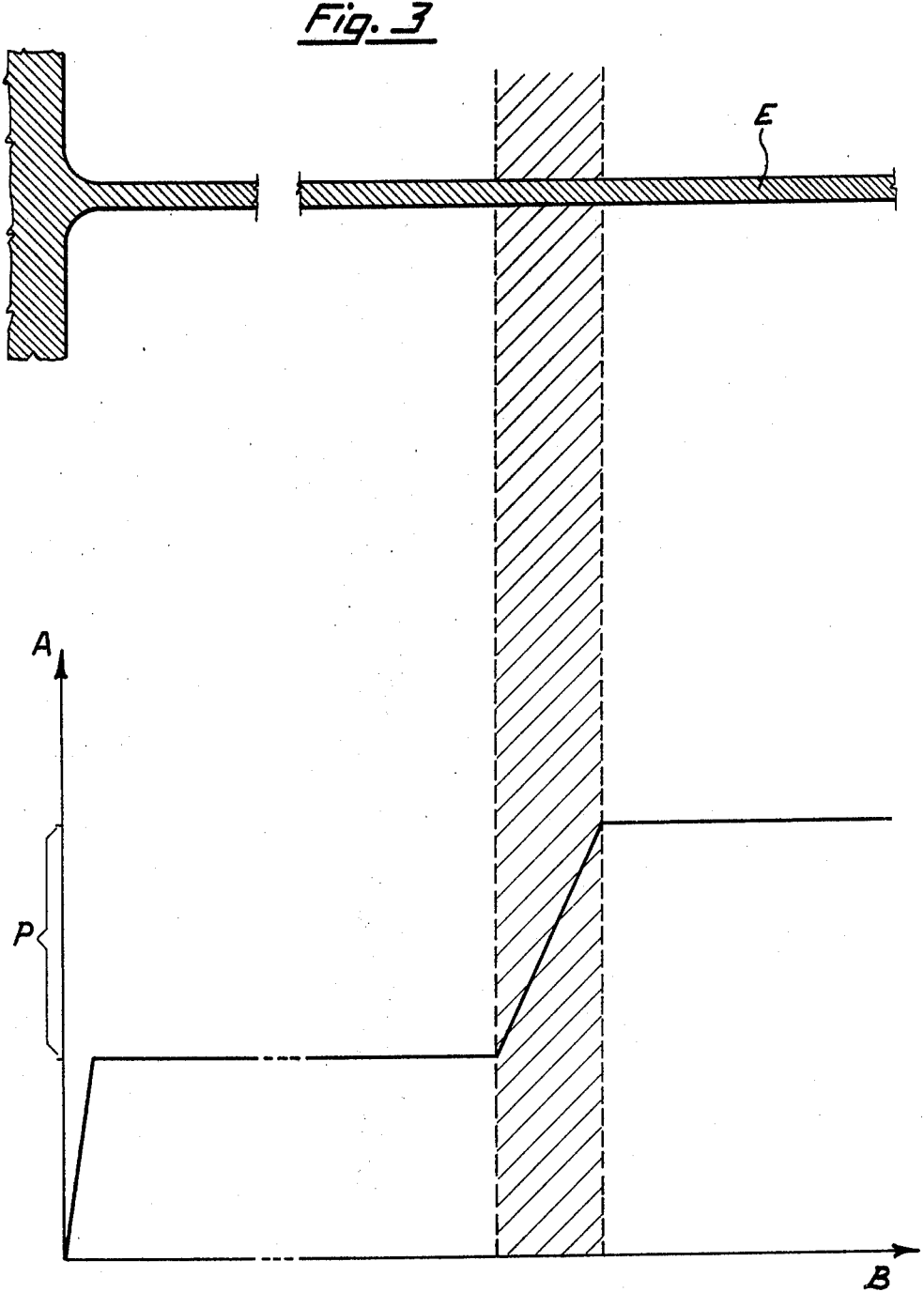
FIG. 3 diagrammatically illustrates an electrically conductive filament produced in accordance with the inventive process and schematically illustrates the dissipation of a potential difference along the length of the filament.
Figure 4:
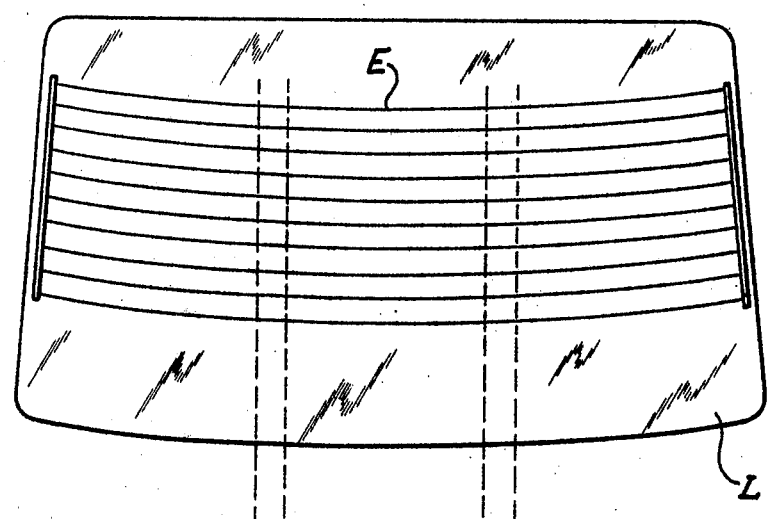
FIG. 4 schematically illustrates a heated rear windshield which can be produced in accordance with the invention and further illustrates a dissipated potential curve as a function of the width of the windshield.
Figure 4:
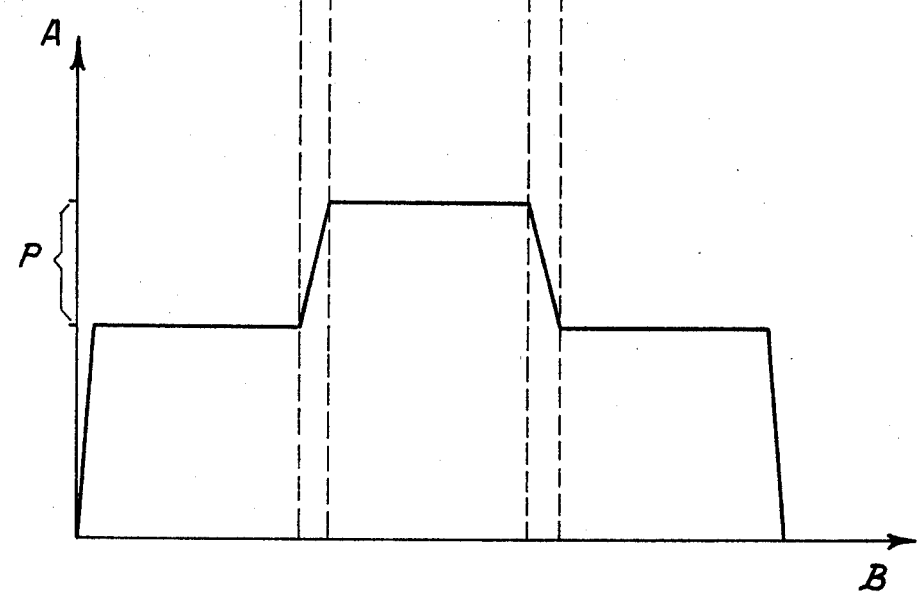

FIG. 1 shows a known screen-printing frame T, in which f indicates the filaments carried onto a photosensitive jelly. The frame will bear inks V, $V_2$, $V_1$, prepared beforehand with different resistivity values, layed by suitable dosimeters in a band located out of the area Z that must be screen-printed;

FIG. 2 is similar to FIG. 1, but shows additionally, below the deposited inks, a spatula or squeegee S, designed so that it can move along direction F, that is across the direction of circuit filaments E transferred onto frame T, so that the screen-printing operation may be completed in one stroke;

FIG. 3 shows an electrically conductive filament E on an enlarged-scale diagram; this filament is produced according to the above process and is characteristic for its regular width and also because it is apt to allow nevertheless a dissipated potential difference P, which is pointed out in the diagram showing the abovesaid potential on ordinates A and the extension of the electrically conductive strip (having areas coated with different inks) on abscissa B;

Finally, FIG. 4 shows a heated rear windshield L which can be produced according to the invention, displaying circuit filaments E, all of which have constant width but suited for allowing a dissipated potential P curve as shown partially in FIG. 3, and as shown again beneath rear windshield L. For better understanding of the drawings and therefore of the process, it should be noted that threads F of the screen-printing mesh may actually have any angle to the circuit filaments E.

Accordingly, an improved process for the production of thermal pane of the type having an electrically conductive circuit on a glass pane is provided. The improvement includes steps of producing a plurality of electrically conductive inks. Each of the inks has a different composition and resistivity. On at least one side of the glass pane a continuous circuit having a constant section along its length is formed by layering each of the inks along the length of the circuit at predetermined locations so that the resistivity of the circuit changes along the length thereof. It is preferred that screen printing be utilized for the forming steps. Each of the inks may include a conductive metal in a different percentage. The conductive metal may, for example, be silver.

While specific embodiments of the invention have been shown and described in detail to illustrate the application of the principles of the invention, it will be understood that the invention may be embodied otherwise without departing from such principles.

We claim:

1. In a process for the production of a thermal pane of the type having an electrically conductive circuit on a glass pane, the improvement comprising the steps of producing a plurality of electrically conductive inks, each of said inks having a different resistivity, forming on at least one side of the glass pane a continuous circuit having a constant section along its length by layering each of said inks along the length of said circuit at predetermined locations so that the resistivity of said circuit changes along the length thereof.

2. The improved process of claim 1, wherein said forming step comprises screen printing.

3. The improved process of claim 2 wherein each of said inks includes a conductive metal in a different percentage.

4. The improved process of claim 3 wherein said conductive metal includes silver.

5. The improved process of claim 2 wherein said step of screen printing comprises providing a plurality of polyester threads on a frame, pouring predetermined quantities of each of said inks on a section of the frame which is located outside the area to be screen printed, providing a layering means operative to layer each of said inks along a predetermined portion of said threads, and operating said layering means to layer each of said inks along said predetermined portion.

6. The improved process of claim 5, wherein said threads are metal coated.

7. The improved process of claim 5, wherein said inks are disposed on said section parallel to said threads.

8. The improved process of claim 5, wherein said inks are disposed on said section at an angle with respect to said threads.

9. The improved process of claim 5, wherein the step of pouring includes pouring inks in adjacent areas so that adjacent inks will mix during said layering step thereby generating a mixture of ink having a resistivity intermediate the resistivity of said adjacent inks.

* * * * *